United States Patent
Thrap

(10) Patent No.: US 7,345,454 B2
(45) Date of Patent: Mar. 18, 2008

(54) ENERGY STORAGE SYSTEM

(75) Inventor: Guy C. Thrap, Del Mar, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 10/876,441

(22) Filed: Jun. 25, 2004

(65) Prior Publication Data

US 2005/0052169 A1    Mar. 10, 2005

Related U.S. Application Data

(63) Continuation-in-part of application No. 10/875,634, filed on Jun. 24, 2004, now abandoned.

(60) Provisional application No. 60/509,055, filed on Jun. 27, 2003.

(51) Int. Cl.
*H02J 7/00*    (2006.01)
*H02J 9/00*    (2006.01)

(52) U.S. Cl. .................. 320/135; 320/167

(58) Field of Classification Search .......... 323/220, 323/222, 223, 225, 265, 268, 271, 272, 282, 323/285, 299, 300, 350; 320/127, 135, 166, 320/167
See application file for complete search history.

(56) References Cited

U.S. PATENT DOCUMENTS

| | | | | |
|---|---|---|---|---|
| 4,384,321 A * | 5/1983 | Rippel | ..................... | 363/124 |
| 5,430,364 A * | 7/1995 | Gibson | ..................... | 323/207 |
| 5,621,607 A | 4/1997 | Farahmandi et al. | | |
| 5,777,428 A | 7/1998 | Farahmandi et al. | | |
| 5,862,035 A | 1/1999 | Farahmandi et al. | | |
| 5,903,449 A * | 5/1999 | Garrigan et al. | ............. | 363/41 |
| 5,907,472 A | 5/1999 | Farahmandi et al. | | |
| 5,982,156 A * | 11/1999 | Weimer et al. | ............. | 323/222 |
| 6,020,719 A * | 2/2000 | Nishigaki et al. | ........... | 320/128 |
| 6,034,514 A * | 3/2000 | Sakai | ..................... | 323/225 |
| 6,059,847 A | 5/2000 | Farahmandi et al. | | |
| 6,094,788 A | 8/2000 | Farahmandi et al. | | |
| 6,140,807 A * | 10/2000 | Vannatta et al. | ............ | 323/283 |
| 6,233,135 B1 | 5/2001 | Farahmandi et al. | | |
| 6,441,592 B1 * | 8/2002 | Rothleitner et al. | ........ | 323/267 |
| 6,445,168 B2 * | 9/2002 | Eisenhardt et al. | ......... | 323/284 |
| 6,452,369 B1 * | 9/2002 | Lang | ..................... | 323/285 |
| 6,590,370 B1 * | 7/2003 | Leach | ..................... | 323/299 |
| 6,593,725 B1 * | 7/2003 | Gallagher et al. | .......... | 323/284 |

\* cited by examiner

*Primary Examiner*—Gary L. Laxton
(74) *Attorney, Agent, or Firm*—Hensley Kim & Holzer, LLC

(57) ABSTRACT

An energy storage system is described for use in, for example, electronics systems such as a bank of computers. The disclosed energy storage systems allows the use of an efficient energy source, such as ultracapacitors, while providing a desired voltage level for an extended period of time. One embodiment of the energy storage system provides power to a load. The system includes a power module including at least one ultracapacitor adapted to store and discharge energy. The power module provides an output voltage as the ultracapacitor discharges energy. The system also includes a voltage regulator for boosting the output voltage of the power module. The voltage regulator may include a voltage converter. The voltage converter may be adapted to boost the output voltage when the output voltage falls below a predetermined threshold. The voltage converter may include a plurality of interleaving inductor circuits, each of the circuits including a switch and an inductor. The switches are adapted to be sequentially closed and opened, thereby in sequence storing energy in the inductors and discharging energy to the load.

30 Claims, 10 Drawing Sheets

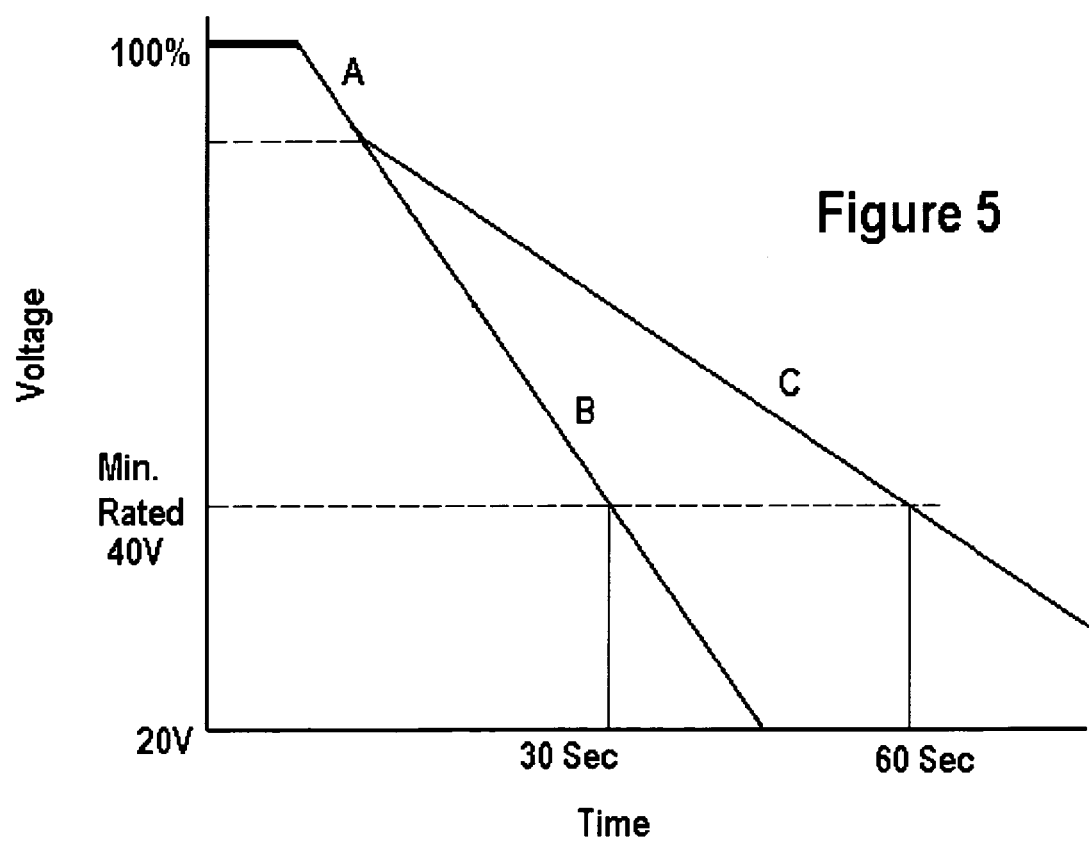

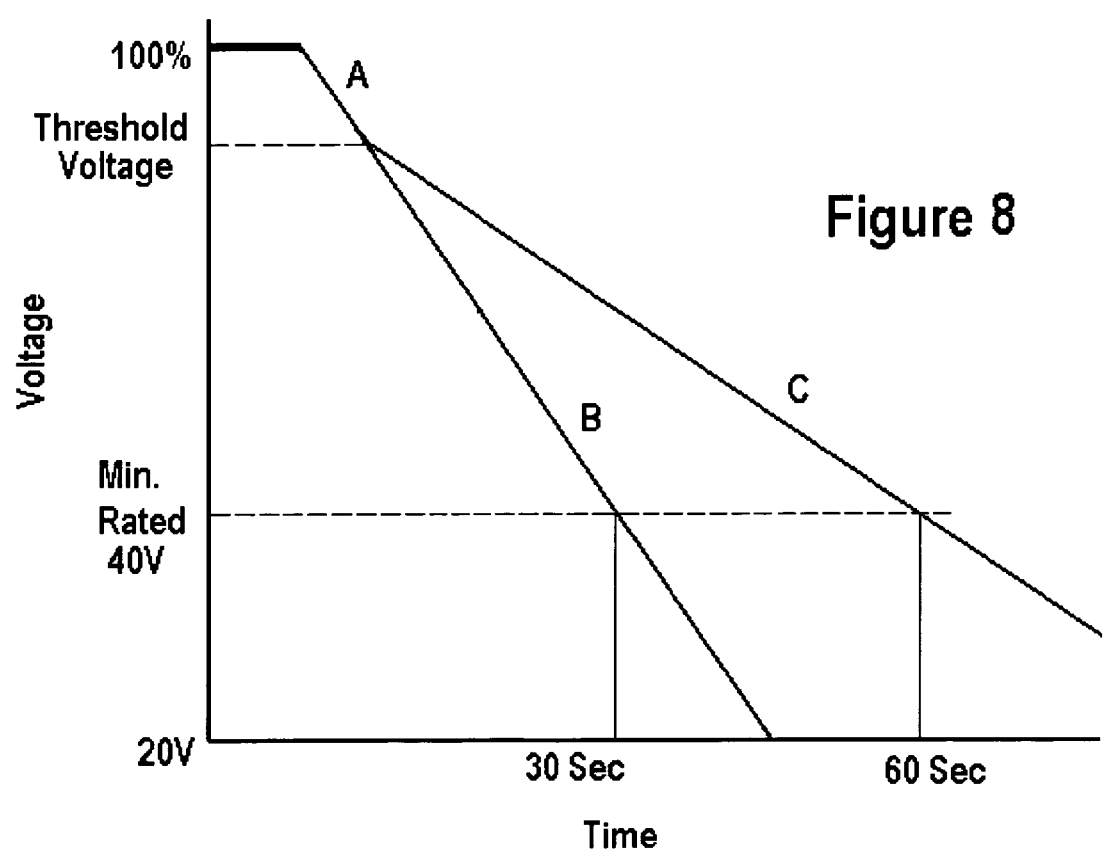

ENERGY STORAGE SYSTEM

RELATED APPLICATION

This application claims priority from, and is a Continuation in Part of commonly assigned U.S. Provisional Application No. 60/509,055, entitled "Energy Storage System," filed on Jun. 27, 2003, which is incorporated herein by reference in its entirety. This application also claims priority from, and is a Continuation in Part of commonly assigned U.S. Non-Provisional Application No. 10/875,634, entitled "Energy Storage System," filed on Jun. 24, 2004, now abandoned which is incorporated herein by reference in its entirety.

FIELD OF THE INVENTION

The present invention relates generally to energy storage systems. More particularly, the invention relates to energy storage systems incorporating ultracapacitors.

BACKGROUND

The following description is provided to assist the understanding of the reader. None of the information provided or references cited is admitted to be prior art to the present invention.

Many systems or devices requiring an electrical power supply also incorporate a backup power supply to avoid disruptions in the operation of the system or device. This can be a critical requirement in the computing arena where, for example, a single power supply may be used for a bank of computers such as servers. The backup power supply can provide power during short gaps that may occur in the event of a temporary failure or fluctuation in the primary power supply or during a transfer from one primary power supply to another primary power supply.

Ideally, the backup power supply should be capable of storing power for an extended period of time, be able to provide substantially constant backup power for a required length of time (at least thirty seconds), and have the ability to recharge quickly.

Batteries have often been used for this backup purpose in many applications. However, batteries have several disadvantages. Primary type batteries tend to naturally deplete over time and lose their ability to store power, resulting in a shelf life of as little as approximately six months. Secondary type rechargeable batteries generally recharge at a much slower rate than their discharge rate. The long recharging period can be a great disadvantage in systems that may experience frequent power failures or transfers. Secondary batteries generally have a limited life span that may be dictated by the number of discharge/recharge cycles. A typical secondary battery may be limited to approximately 2,000 cycles. Both types of batteries have unpredictable lifetimes, in other words, it is difficult to predict when a battery will reach the end of its useful voltage or life. Batteries, such useful life can typically be predicted to only within about 40%, in other words, if a battery is expected to provide a minimum voltage for 10 hours, in reality such voltage might occur at any time between 6 hours and 14 hours.

Ultracapacitors are capable of storing energy and provide the advantage of rapid rechargeability. Ultracapacitors can generally recharge at the same rate as the discharge rate. However, the output voltage from an ultracapacitor generally declines rapidly, thereby reducing the available time for back up power. As an example, FIG. 1 illustrates the decline in the output voltage of an exemplary bank of ultracapacitors. The desired output voltage is generally a range of voltages. In this example, the desired range is indicated by the maximum (100%) voltage level and a minimum rated voltage level. A bank of ultracapacitors at full initial charge declines to the minimum voltage level rapidly (approximately 30 seconds in the example). By so rapidly reaching the minimum rated voltage, much of the energy stored in the ultracapacitors is rendered unusable. For example, only 45% of the energy stored in the ultracapacitors may have been used when the output voltage declines to the minimum rated voltage.

It is desirable to have a power source that provides a long storage life, constant output voltage for an extended length of time, ability to recharge quickly, and predictable useful voltage.

SUMMARY OF THE INVENTION

The invention described herein relates to an energy storage system for use in systems that utilize energy. The invention relates to an energy storage system that allows the use of an efficient energy source, such as ultracapacitors, while providing a desired voltage level for an extended period of time. Further, the invention provides for a power source which discharges according to a desired profile, thereby providing a predictable discharge behavior.

In one aspect, the invention includes an energy storage system for providing power to a load. The system includes a power module including at least one ultracapacitor adapted to store and discharge energy. The power module provides an output voltage as the ultracapacitor discharges energy. The system also includes a regulator adapted to regulate the output voltage of the power module. The regulator includes a discharge control circuit adapted to provide a predetermined voltage profile across the load. The profile is a function of a present voltage of the power module.

A load may be any unit or system requiring electrical energy, for example, a bank of computers that require constant energy may comprise a load. In one embodiment, the disclosed energy storage system may be utilized for backup power in case of failure or transition of a primary power system.

"Ultracapacitors" are well-known to those skilled in the art. Ultracapacitors can provide a large amount of capacitance in a very small form factor, for example, 500 Farads in a D-cell battery sized capacitor housing. Ultracapacitors are also known to those skilled in the art as double-layer capacitors and supercapacitors. Ultracapacitors generally include two current collecting plates, each having a corresponding electrode and being separated by a separator. Energy is stored in the form of a charge at the separated electrodes. For more detail on ultracapacitors, reference may be made to U.S. Pat. Nos. 5,621,607, 5,777,428, 5,862,035, 5,907,472, 6,059,847, 6,094,788 and 6,233,135, each of which is hereby incorporated by reference in its entirety.

In one embodiment, a "power module" may be a bank of ultracapacitors, such as twenty-two 2700-farad ultracapacitors connected in series and interconnected to balancing circuits to maintain balanced voltage across the ultracapacitors. The power module may be implemented as a rack-mountable package containing the bank of ultracapacitors.

In one embodiment, a discharge control circuit includes a comparator for comparing a voltage across the load to a reference voltage. A power stage for controlling the regulator based on an output of the comparator is also provided.

In one embodiment, a regulator includes at least one inductor circuit. In one embodiment, the regulator includes two or more interleaving inductor circuits. Each of the interleaving inductor circuits includes a switch and an inductor. The switches are adapted to be selectively closed and opened, thereby selectively storing energy in the inductors and discharging energy to the load. The switches can be controlled by the discharge control circuit.

In one aspect, the invention provides a regulator circuit for regulating an output from a source powering a load. The regulator circuit includes an inductor circuit having at least one inductor and switching means for selectively opening and closing the inductor circuit for selectively discharging energy to the load and storing energy in the inductors. A discharge regulating circuit is provided and is adapted to control an output voltage profile. The discharge regulating circuit monitors a present voltage from the power source and controls the switching means in response to the present voltage.

In one aspect, the invention provides a regulator circuit having two or more interleaved inductor circuits, switching means for selectively opening and closing each of the inductor circuits for selectively discharging energy to the load and storing energy in the inductors, and a discharge regulating circuit. The discharge regulating circuit is adapted to control an output voltage profile. The discharge regulating circuit monitors a present voltage from the power source and controls the switching means in response to the present voltage.

In one embodiment, a system for providing power to a load comprises a module comprising at least one capacitor adapted to store and discharge energy, the module providing an output voltage as the capacitor discharges energy; and a regulator adapted to regulate the output voltage of the module, the regulator including a discharge control circuit adapted to provide a predetermined voltage profile across the load, the profile being a function of a present voltage of the module. The discharge control circuit may include a comparator for comparing a voltage across the load to a reference voltage, and a power stage for controlling the regulator based on an output of the comparator. The regulator may be adapted to boost the output voltage when the output voltage falls below a predetermined threshold. The regulator may be adapted to boost the output voltage to a voltage within a predetermined range. The regulator may include at least one inductor circuit. The regulator may include two or more interleaved inductor circuits. Each of the interleaving inductor circuits may include a switch and an inductor, and the switches may be adapted to be selectively closed and opened, thereby selectively storing energy in the inductors and discharging energy to the load. The switches may be controlled by the discharge control circuit. The interleaving inductor circuits may be adapted to selectively pass current to the load and bypass the load. The capacitor may comprise an ultracapacitor. The system may comprise a back up power system. The system may comprise an automotive system.

In one embodiment, a regulator circuit for regulating an output from an ultracapacitor power source powering a load may comprise an inductor circuit having at least one inductor; switching means for selectively opening and closing the inductor circuit for selectively discharging energy to the load and storing energy in the inductors; and a discharge regulating circuit adapted to control an output voltage profile, the discharge regulating circuit monitoring a present voltage from the power source and controlling the switching means in response to the present voltage.

In one embodiment, a regulator circuit for regulating an output from an ultracapacitor power source powering a load may comprise two or more interleaved inductor circuits, each inductor circuit having at least one inductor; switching means for selectively opening and closing each of the inductor circuits for selectively discharging energy to the load and storing energy in the inductors; and a discharge regulating circuit adapted to control an output voltage profile, the discharge regulating circuit monitoring a present voltage from the power source and controlling the switching means in response to the present voltage.

In one embodiment, a method of storing energy in one or more ultracapacitor and discharging the energy to a load may comprise steps of: monitoring a present voltage of the one or more ultracapacitor; and providing a voltage profile across the load according to the present voltage. The method may comprise a step of operatively coupling one or more inductor to the one or more ultracapacitor; and selectively discharging energy to the load from inductors. At any given time the voltage profile may be predicted with an accuracy of 10% or better.

In one embodiment, an energy source for providing energy to a load may comprise at least one ultracapacitor; at least one inductor coupled in series with the inductor; and a circuit, wherein the circuit, the at least one ultracapacitor, and the at least one inductor are operatively coupled to provided a voltage profile across the load. The load may be an electric motor. The motor may be a hybrid vehicle electric motor. At any given time, the voltage profile may describe a discharge curve of the system with an accuracy of 10% or better. At any given time, the voltage profile may describe a discharge curve of the system with an accuracy of about 1%. The inductor may be rated to handle a current of more than 50 amps. The source may be capable of providing up to 144,000 joules of energy to the load for more than 30 seconds. The energy source may be a back up source of energy. At least one ultracapacitor and at least one inductor may be connected to each other directly.

While aspects, benefits, advantages, and embodiments of the present invention are described herein, it would be understood that such descriptions are exemplary of the present invention, which should be limited only by the claims and their legal equivalents.

DESCRIPTION OF DRAWINGS

FIG. 5 is a chart illustrating one sample output voltage of an embodiment of an energy storage system according to the present invention;

FIG. 8 is a chart illustrating one sample output voltage of an embodiment of an energy storage system with a discharge-controlling voltage regulator according to the present invention.

DETAILED DESCRIPTION

The present invention is generally directed to a power source adapted to provide power to a load. In this regard, the present invention includes an energy storage system that can provide long storage life, constant power for an extended length of time, predictability of useful life, and the ability recharge quickly.

The disclosed implementation of an energy storage system provides the ability to maintain a desired output voltage for an extended period while providing an energy source that can recharge rapidly and can last for practically unlimited number of dis/charge cycles.

Figure 2:
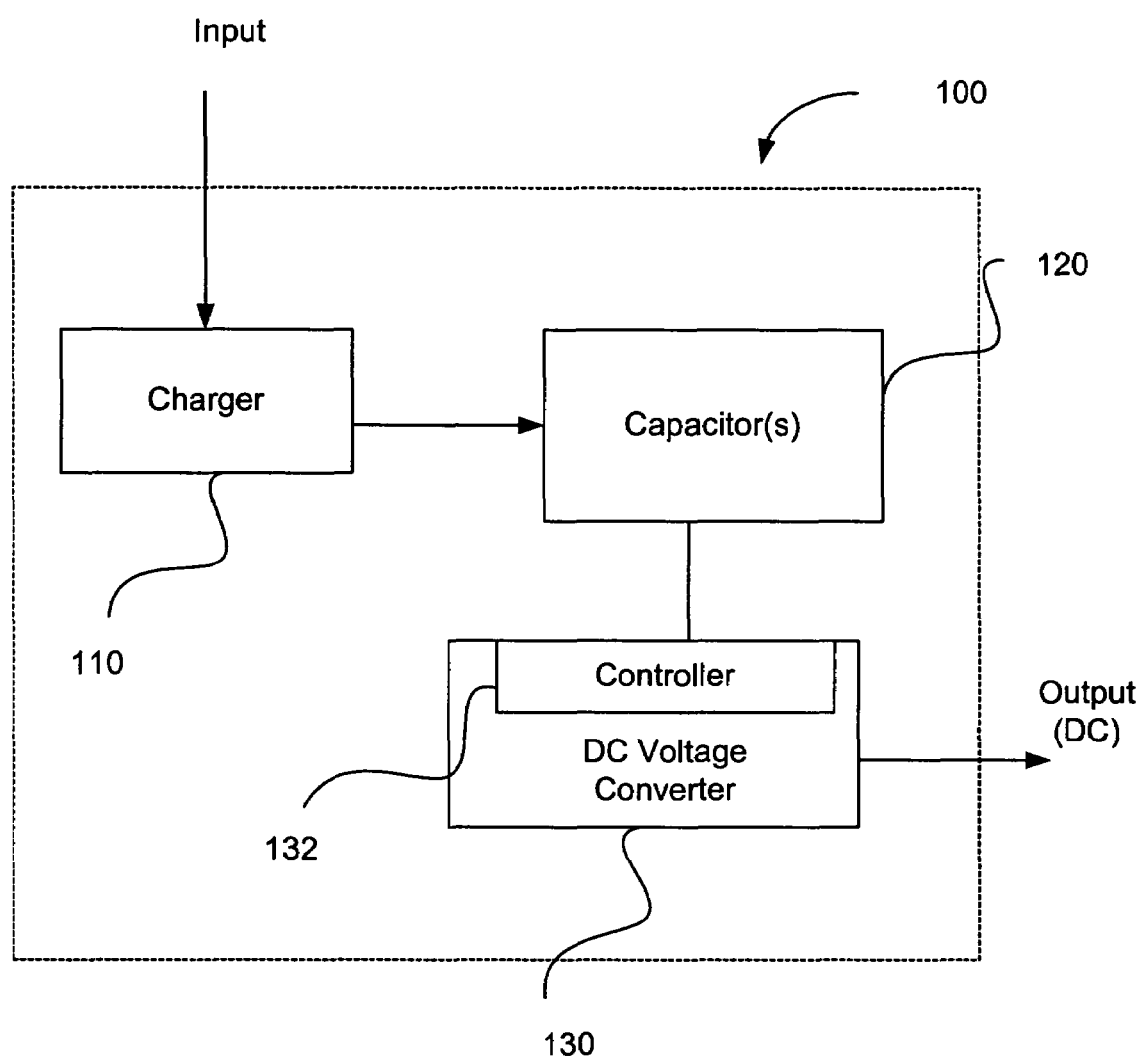
FIG. 2 is a diagrammatic illustration of one embodiment of an energy storage system according to the present invention.

FIG. 2 illustrates one embodiment of an energy storage system according to the present invention. The energy storage system 100 can receive inputted energy, for example, from a reservoir or a grid (not shown). The input energy may be either direct current (DC) or alternating current (AC). A DC voltage is output by the energy storage system 100 to a load (not shown).

The input energy is directed to a charger 110 which may be provided within the energy storage system 100. The charger 110 is used to recharge one or more ultracapacitor provided within a power module 120. The charger 110 may alternatively be provided separately from the energy storage system 100. The charger 110 is utilized when the power module 120 is to be recharged with energy.

The power module 120 may contain any number of ultracapacitors to provide a desired energy level to the load. For example, a load requiring an average power of 4800 watts for 30 seconds or more, or 144,000 joules of energy, may be satisfied with two parallel banks of twenty-three 2700-farad ultracapacitors.

Figure 3:
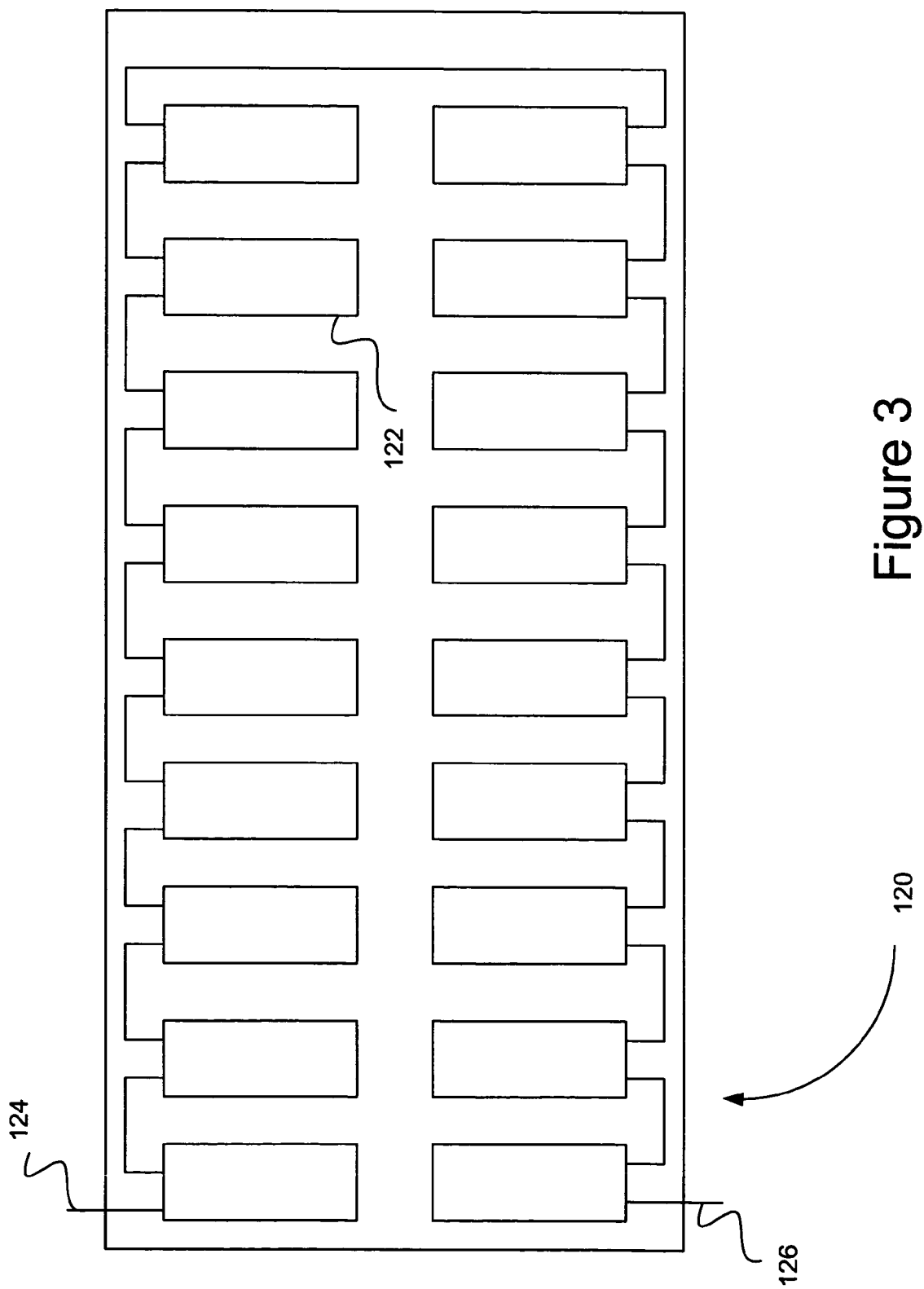
FIG. 3 illustrates, in detail, one embodiment of a capacitor bank for use with the energy storage system illustrated in FIG. 2.

One embodiment of the power module 120 is illustrated in FIG. 3. The illustrated embodiment of the power module 120 includes a bank of ultracapacitors, such as ultracapacitor 122, connected in series. A pair of leads 124, 126 are provided to connect the power module 120 to the load. Either the same leads 124, 126 or another set of leads (not shown) may be used for charging the bank of ultracapacitors. Also not shown are voltage balancing circuits that could be interconnected between ultracapacitors to maintain a balanced voltage across the ultracapacitors.

Referring again to FIG. 2, the energy storage system 100 further includes a voltage regulator module 130. The voltage regulator module 130 is adapted to convert the DC voltage from the power module 120 to an output voltage desired by the load. For example, as the bank of ultracapacitors in the power module 120 discharges, a drop in the voltage from the power module is experienced. As the voltage drops below a predetermined threshold, the voltage regulator module 130 may boost the voltage to assure the output voltage to the load is maintained within a desired range.

The voltage regulator module 130 may be provided with a controller 132. The controller 132 is adapted to detect the drop in the voltage from the power module 120 and, when the voltage drops below the predetermined threshold, to initiate a voltage conversion. The controller 132 may be implemented as hardware, firmware, and/or software. In one embodiment, the controller is a microprocessor controlling one or more components of a circuit.

The predetermined threshold may be set at a level suited for a particular application. Preferably, the predetermined threshold is well above the minimum voltage requirement for the load. For example, the threshold may be set at the midpoint of the minimum and maximum voltage requirement of the load.

Figure 4A:
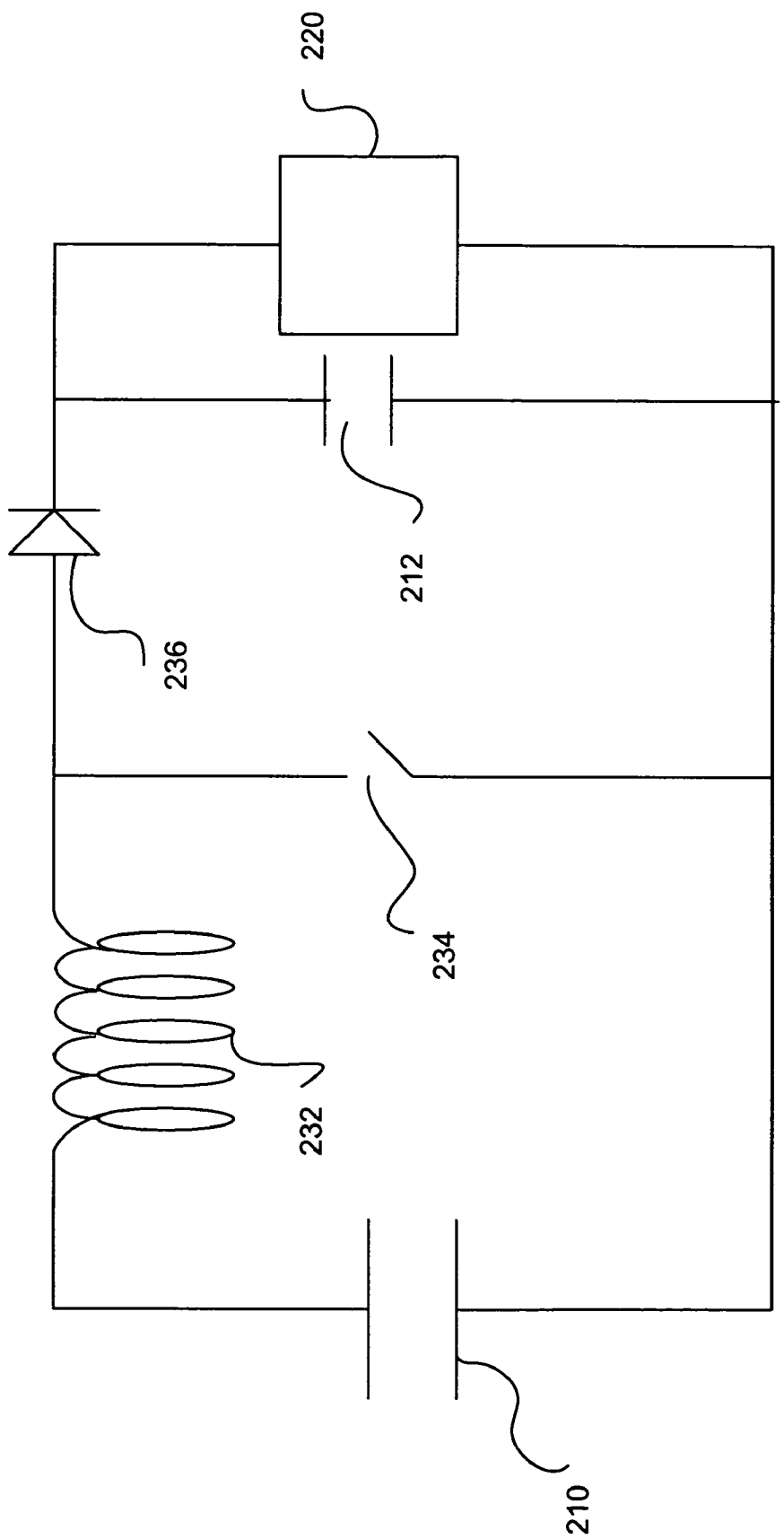
FIG. 4A is a schematic illustration of one embodiment of an energy storage system with a voltage regulator according to the present invention.

FIG. 4A schematically illustrates one embodiment of an arrangement using an energy storage system with a voltage regulator. In the illustrated energy storage system 200, a power module 210 provides electrical power to a load 220. The current from the power module 210 is directed through an inductor circuit 230. The inductor circuit 230 includes an inductor 232 and a switch 234. The value of the inductor 232 may be selected to achieve a desired result.

When the switch 234 is open (as illustrated), the current from the power module 210 flows through the inductor 232 and to the load 220, resulting in a voltage from the power module 210 being applied across the load 220 and capacitor 212. When the switch 234 is closed, the current passes through the inductor 232, but bypasses the load 220, in which case the voltage from the power module 210 is applied across the inductor 232, causing energy to be stored in the inductor 232. When the switch 234 is subsequently opened, the voltage from the power module 210 as well as the stored energy in the inductor 232 is applied to the load.

The inductor circuit 230 is also provided with a diode 236. The diode 236 prevents backflow of current when the switch is closed. This prevents unintentional drawing of current from the load. By selectively opening and closing the switch 234, the voltage across the load can be maintained at a higher level than that available directly from the power module 210. The opening and closing of the switch 234 may be controlled by a controller, such as a microprocessor. Alternatively, the switch 234 may be adapted to be opened and closed at a regular frequency. In one embodiment, the switch 234 is opened and closed at a rate of about 50 KHz, but in other embodiments other rates of on-off closure are also within the scope of selection by those skilled in the art.

A capacitor 212 is provided across the load 220. The capacitor 212 prevents quick changes in voltage across the load. The capacitance level of the capacitor 212 is relatively small when compared to that of the power module 210. The capacitor 212 is selected to be of appropriate value such that it becomes charged when switch 234 is open, and such that when switch 234 is closed it is discharged through the load 220. In this manner, load 220 is provided with a current for its operation. In one embodiment, capacitor 212 may provide a filtering function. In one embodiment, capacitor 212 comprises an electrolytic capacitor. In one embodiment, capacitor 212 comprises a value of 0.1 Farad and inductor circuit 230 comprises a value of 1 micro Henry, but in other embodiments other values for both these two components are also within the scope of selection by those skilled in the art.

Figure 4B:
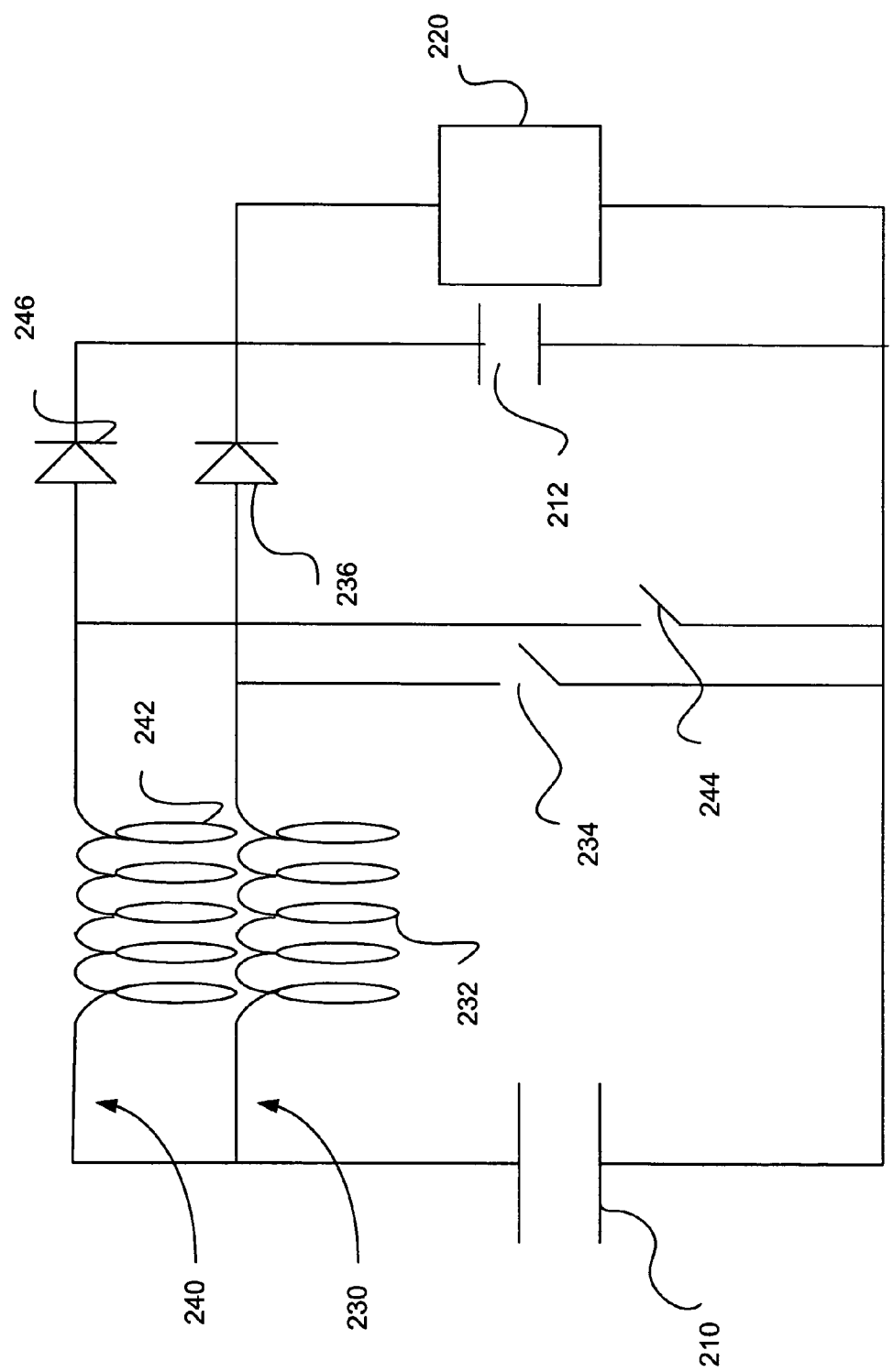
FIG. 4B is a schematic illustration of another embodiment of an energy storage system with a voltage regulator according to the present invention.

The use of the inductor circuit 230 to boost the voltage across the load may cause a ripple in the voltage. In other words, a fluctuation in the voltage may be experienced by the load. This ripple can be reduced by providing two or more interleaved inductor circuits, as illustrated in FIG. 4B. Although the illustrated arrangement of FIG. 4B includes two inductor circuits 230, 240, in other embodiments, a larger number of such circuits may be employed.

Each inductor circuit 230, 240 includes an inductor 232, 242, a switch 234, 244 and a diode 236, 246. In operation, each switch 234, 244 is sequentially opened and closed. In one embodiment, when the first switch 234 is open, the second switch 244 is closed. Subsequently, the second switch 244 is opened, and the first switch 234 is closed. This is repeated at a frequency that is sufficiently high to produce a relatively smooth voltage profile applied to the load 220. In one embodiment, the alternating of the switches is performed at approximately 65 KHz.

Figure 1:
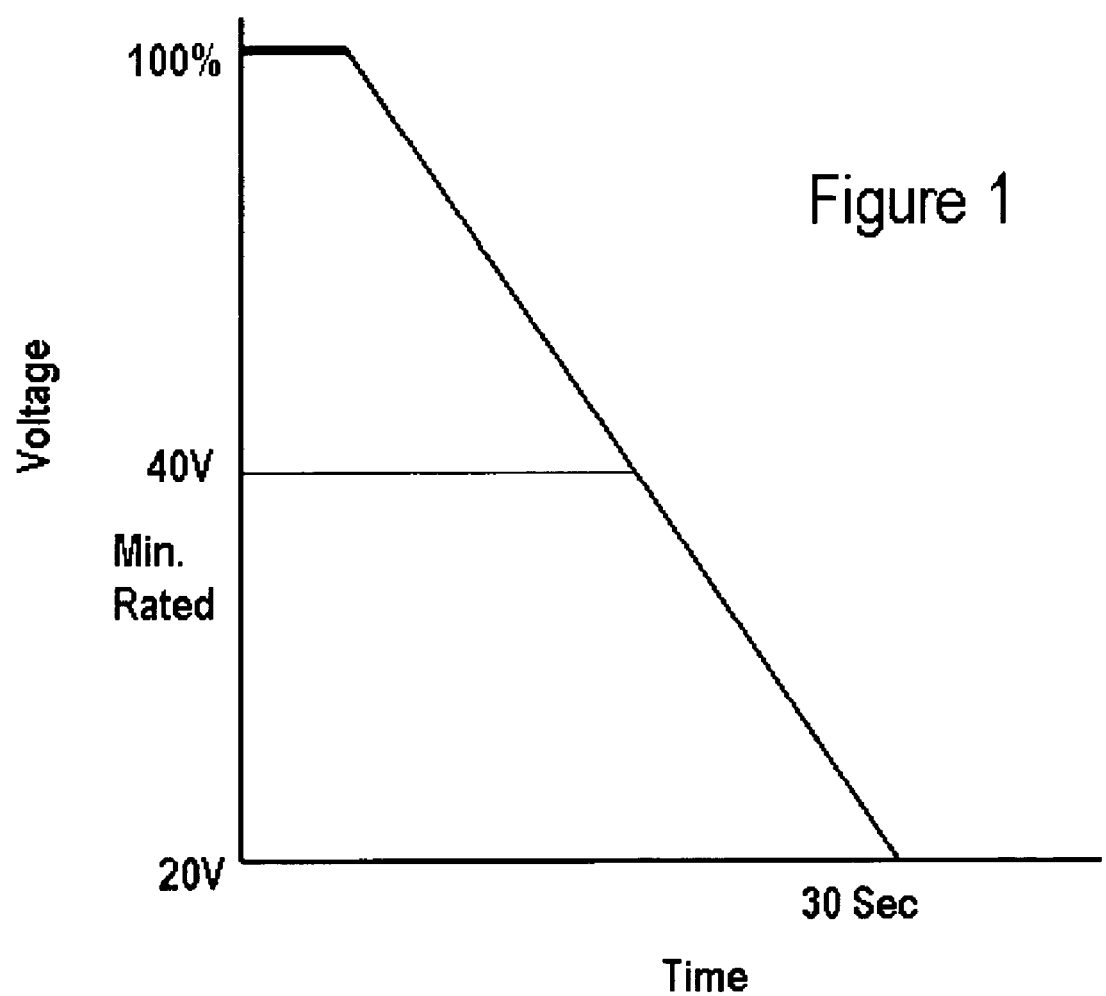
FIG. 1 is a chart illustrating the output voltage degradation of an uncontrolled ultracapacitor bank discharge.

An exemplary voltage profile resulting from the above-described voltage regulation is illustrated in FIG. 5. When a fully charged, ultracapacitor power module is applied to a load, the voltage is initially at 100 percent of the rating of the power module. Preferably, this is substantially identical to the maximum voltage requirement of the load. Similar to the profile illustrated in FIG. 1, the output voltage from the power module begins to decline shortly after access by the load (segment A). Once the voltage from the power module reaches a threshold voltage level, the voltage regulation described above may be initiated. As a result of the voltage regulation, the rate of decline of the output voltage to the load is significantly reduced. Segment C indicates the voltage with regulation, and segment B indicates the output voltage with no regulation (same as that illustrated in FIG. 1). Thus, the output voltage can be maintained above a minimum voltage requirement of the load for a significantly longer period than without the voltage regulation. Further, a substantially greater amount of the energy available in the ultracapacitors of the power module is utilized. For example, whereas only 45 percent of the stored energy is utilized without voltage regulation (FIG. 1), voltage regulation allows use of 87 percent of the stored energy.

In one configuration, the bank of ultracapacitors is mounted within a rack-mountable module for use with a server rack that may contain a bank of computers, such as servers. The rack-mountable module is preferably 2 U (3.5 inches) in height and contains twenty-two ultracapacitors. Another embodiment of the rack-mountable module contains forty-six ultracapacitors and is 4 U (7 inches) in height. Similarly, the electronics including the voltage converter, controller and charger may be mounted in such a rack-mountable module.

Traditional inductors include a single core made of a magnetizeable material, such as iron. The core is surrounded by a wire coil having a number of windings, each end of which constitutes a lead for connection in a circuit. Thus, the traditional inductor includes a single core with multiple windings. To handle large currents and/or to provide large inductance values, traditional inductors would need to comprise very large form factors. Those skilled in the art will identify that to handle such large current and to fit within an appropriately sized rack-mountable module as described herein, use of a traditional inductor would be made impractical if not impossible. To this end, one or more of the inductors described herein comprises a new and novel design.

Figure 6:
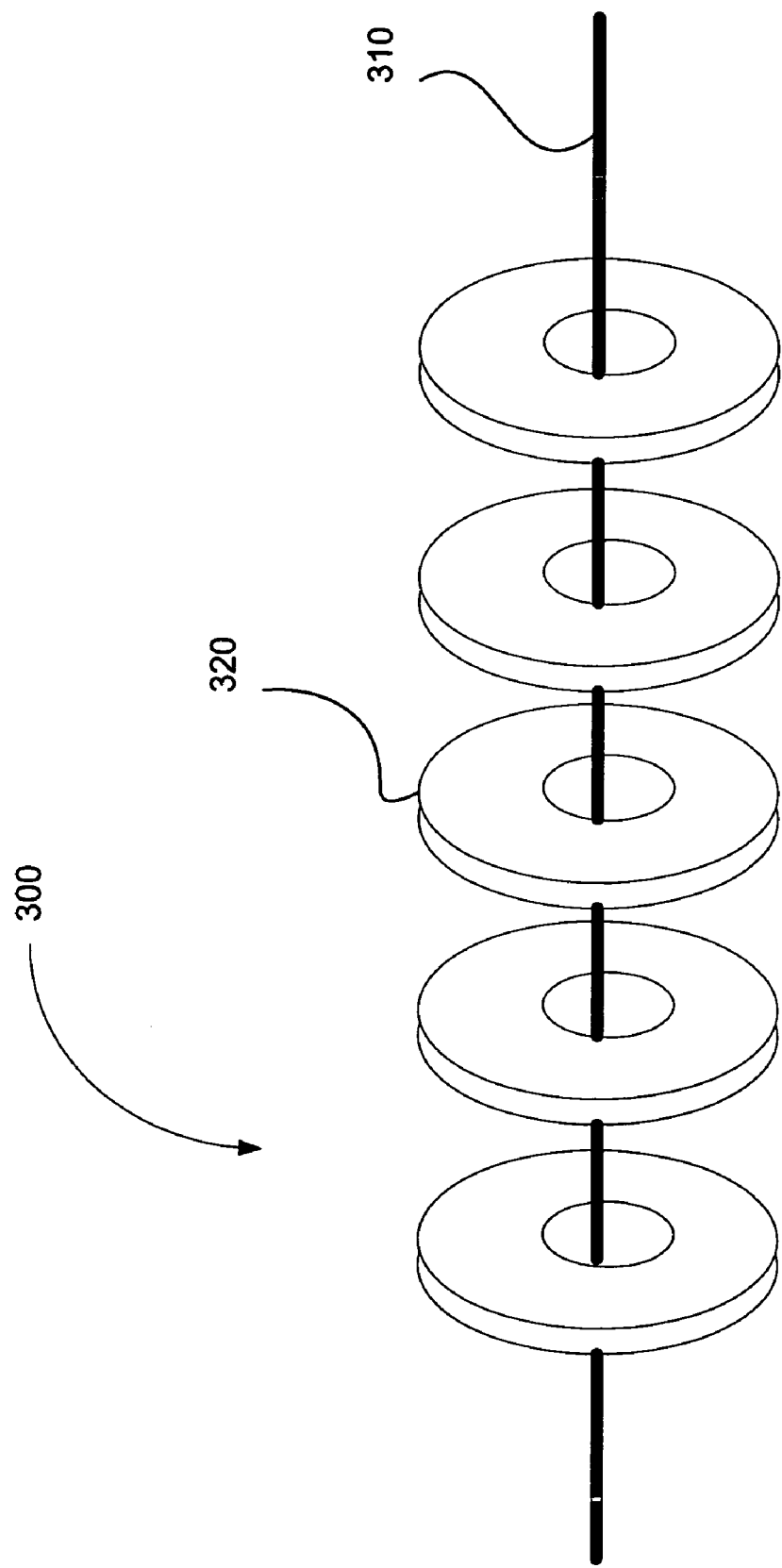
FIG. 6 illustrates one embodiment of an inductor according to the present invention.

FIG. 6 illustrates one embodiment of a low-profile high current capable inductor according to the present invention. The low-profile inductor 300 illustrated in FIG. 6 includes a single electrically conductive segment 310 passing through a plurality of rings 320. The rings 320 are made of a magnetizeable material, such as iron, and may be encapsulated in an insulative material. The rings 320 are sized according to design requirements, as is the number of rings provided in the inductor 300. In one embodiment, the rings have an outer diameter of approximately 1 inch, an inner diameter of 0.25 inches and a width of approximately 0.125 inches. In one embodiment thirty three rings 320 are positioned in a spaced apart configuration along the length of the conductive segment 310. In one embodiment, the rings are equally spaced apart along the length of the segment 310. The electrically conductive segment 310 is generally a linear wire segment through which current can flow when the segment 310 is connected to a circuit. The length and diameter of the segment 310 can be selected according to the requirements of the inductor 300. The conductive segment 310 can be made of any conductive material, such as copper or aluminum. When current flows through the segment 310, a magnetic field is created around the segment 310. The energy in the magnetic field can be stored in the rings 320. In one embodiment, the segment 310, comprises a hollow tubular structure comprising an outer diameter and an inner diameter over and/or through which a gas or fluid may be passed to remove heat generated during use of embodiments described herein. In one embodiment, the inductor is rated to handle 50 amps or more of current. In one embodiment, the inductor 300 is capable of efficiently and safely handling about 200 amps when used with embodiments of the present invention described herein. Thus, inductor 300 enables a relatively low profile, allowing implementation of a power module as described herein in a small form factor module. Further, the configuration illustrated in FIG. 6 offers improved thermal characteristics allowing for use of one or more inductor at high current.

The energy storage system described above may be used to replace a battery-based power source. In the prior art because batteries discharge according to an unpredictable slope, a load cannot recognize when the voltage is approaching a minimum acceptable level and can not take appropriate actions, such as shutting down just prior to reaching the minimum acceptable level. In this regard, the present invention provides not only for extended capacitor discharge time, it also provides that such discharge can occur in a predictable manner.

Figure 7A:
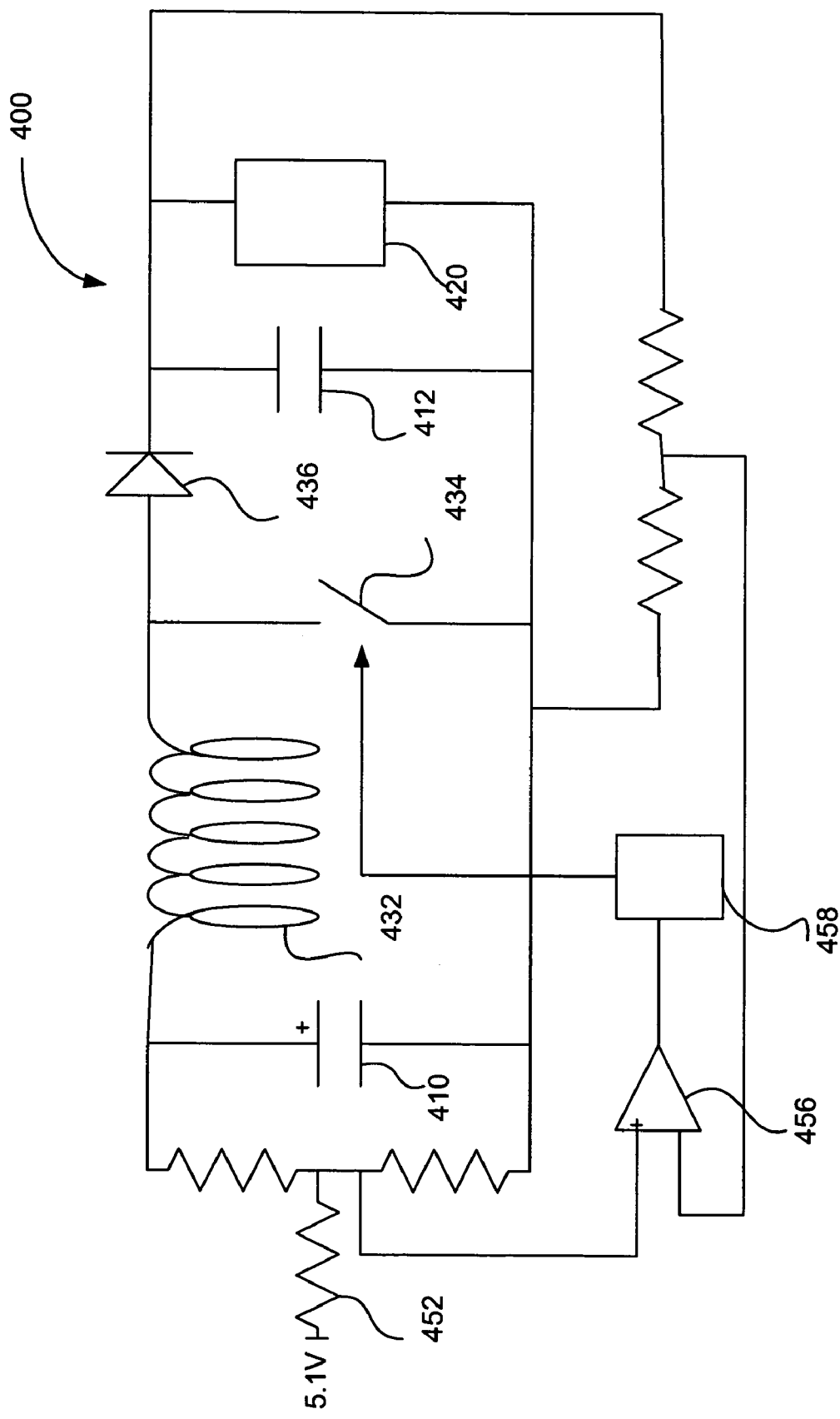
FIG. 7A is a schematic illustration of one embodiment of an energy storage system with a discharge-controlling voltage regulator according to the present invention.

FIG. 7A illustrates one embodiment of an energy storage system with a controlled-discharge voltage regulator. As with the voltage regulators described above with reference to FIGS. 4A and 4B, the energy system 400 of FIG. 7A includes a power module 410 supplying power to a load 420. An inductor circuit 430 includes an inductor 432, a switch 434 and a diode 436. Further, a relatively low-level capacitor 412 is provided across the load 420.

A discharge control circuit 450 is provided to control the voltage profile across the load 420. The discharge control circuit 450 includes a reference voltage 452 of 5.1 volts provided across the power module 410. The reference voltage 452 is supplied to the positive input of a comparator 456. The negative input of the comparator 456 includes the voltage detected across the load 420 through line 454. Thus, the comparator 456 is able to determine the present voltage across the load 420. The phrase "present voltage" is used here to refer to the voltage detected, measured or determined by the comparator 456. It will be understood by those skilled in the art that such voltage may or may not be the instantaneous voltage. The output of the comparator 456 is provided to a power stage 458. The power stage 458 may be a controller, such as a microprocessor. The power stage 458 includes information relating to a desired discharge profile. For example, the power stage 458 may be provided with information indicating a desired constant slope discharge once the voltage across the load 420 declines to a predetermined threshold.

Thus, through the output of the comparator 456, the power stage 458 can monitor the voltage across the load 420. When the voltage declines to the predetermined threshold, the power stage 458 begins control of the switch 434 of the inductor circuit 430 to achieve the desired voltage profile across the load 420. Thus, the discharge control circuit 450 serves as a feedback circuit to achieve the desired results. In this regard, the voltage across the load 420 is monitored through the comparator 456 and is controlled through operation of the inductor circuit 430. In this manner, any desired voltage profile can be achieved across the load 420.

Figure 7B:
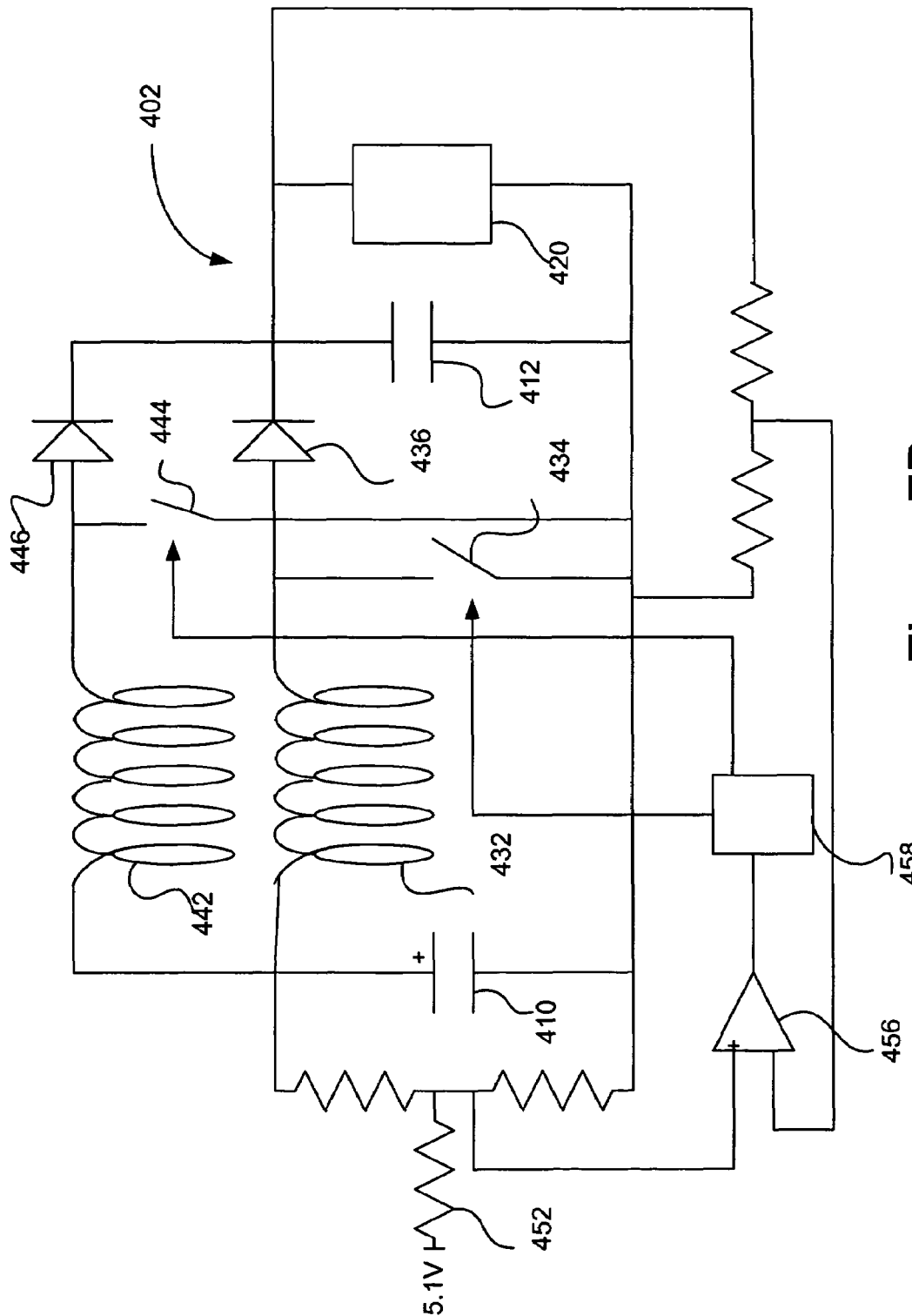
FIG. 7B is a schematic illustration of another embodiment of an energy storage system with a discharge-controlling voltage regulator according to the present invention.

As illustrated in FIG. 7B, an energy system 402 including a discharge control circuit 450 may be provided with a plurality of interleaved inductor circuits 430, 440, similar to those described above with reference to FIG. 4B. Each inductor circuit 430, 440 includes an inductor 432, 442, a switch 434, 444, and a diode 436, 446. The power stage 458 controls each switch 434, 444 of the inductor circuits 430, 440 to achieve the desired voltage profile. As noted above, the use of interleaved inductor circuits reduces fluctuations in the voltage across the load 420.

An exemplary voltage profile resulting from the above-described controlled-discharge voltage regulation is illustrated in FIG. 8. When a fully charged, ultracapacitor power module is applied to a load, the voltage is initially at 100 percent of the rating of the power module. Similar to the profiles illustrated in FIGS. 1 and 5, the output voltage from the power module begins to decline shortly after access by the load (segment A). Once the voltage from the power module reaches a threshold voltage level, the discharge-controlled voltage regulation described above is initiated. The example illustrated in FIG. 8 indicates a predictable desired voltage profile. In this regard, the discharge is controlled to provide a constant-slope decline in the voltage across the load. Segment D indicates the voltage with discharge-controlled regulation, and segment B indicates the output voltage with no regulation (same as that illustrated in FIG. 1). Thus, the period of availability of an acceptable voltage level is considerably increased, while providing a predictable voltage profile. In one embodiment, the predictability of when the discharge curve reaches a particular voltage can be predicted with an accuracy of 10% or less, for example, when Segment D drops below a minimum rated voltage. In one embodiment, a drop below some minimum voltage can be predicted to occur with an accuracy of about 1%, for example, if an embodiment of an energy storage system as described herein can expected to provide voltage above some minimum voltage for 10 hours, in reality such a minimum voltage might be reached any where between 9.9 and 10.1 hours.

Accordingly, embodiments disclosed herein provide an energy source that exhibits short recharging time, an extended duration of provided voltage, and a predictable voltage profile. A rechargeable energy source with predictability in discharge performance can allows that remedial measures be taken in a timely manner before or at a particular point along a discharge curve. In a hybrid automotive application, wherein the load could comprise an electric motor, such predictability would help in determining the time at which a switchover from a capacitor power source to another source of power would need to occur, for example, a fuel cell or a combustion motor, would need to occur. Because the time of switchover can be made in a more predictive manner, operation of a hybrid vehicle from a capacitor based power source can be extended, thus increasing an operating range of the vehicle before switching to another power source.

Although the particular systems and methods herein shown and described in detail are fully capable of attaining the above described objects and advantages of this invention, it is understood that the description and drawings presented herein represent some, but not all, contemplated embodiments. It should be apparent to one of ordinary skill in the art that numerous alterations may be made without departing from the spirit or scope of the invention. For example, resistors capacitors, inductor, and diode values may vary according to application, and could be selected by those skilled in the art without undue experimentation. It is also envisioned that one or more components disclosed herein may implemented in analog form or digital form, including as PLD, firmware, and/or software implementations. Therefore, the invention is not to be limited except in accordance with the following claims and their equivalents.

We claim:

1. A system for providing power to a load, comprising:
a module comprising at least one capacitor adapted to store and discharge energy, the module providing an output voltage as the capacitor discharges energy; and
a regulator adapted to regulate the output voltage of the module, the regulator including a discharge control circuit adapted to provide a predetermined predictable voltage profile across the load to allow for remedial action to be taken in response to the predetermined predictable voltage profile, wherein the predetermined predictable voltage profile predictably varies in accordance with a decrease in the output voltage of the module.

2. The system according to claim 1, wherein the discharge control circuit includes a comparator for comparing a voltage across the load to a reference voltage, and a power stage for controlling the regulator based on an output of the comparator.

3. The system according to claim 1, wherein the regulator is adapted to boost the output voltage when the output voltage falls below a predetermined threshold.

4. The system according to claim 1, the predetermined predictable voltage profile comprises a constant slope discharge profile.

5. The energy storage system according to claim 1, wherein the regulator includes at least one inductor circuit.

6. The system according to claim 5, wherein the regulator includes two or more interleaved inductor circuits.

7. The system according to claim 6, wherein each of the interleaving inductor circuits includes a switch and an inductor, and wherein the switches are adapted to be selectively closed and opened, thereby selectively storing energy in the inductors and discharging energy to the load.

8. The system according to claim 7, wherein the switches are controlled by the discharge control circuit.

9. The system according to claim 6, wherein each of the interleaving inductor circuits is adapted to selectively pass current to the load and bypass the load.

10. The energy storage system of claim 1, wherein the capacitor comprises an ultracapacitor.

11. The system of claim 1, wherein the system comprises a back up power system.

12. The system of claim 1, wherein the system comprises an automotive system.

13. A regulator circuit for regulating an output from an ultracapacitor power source powering a load, comprising:
an inductor circuit having at least one inductor;
switching means for selectively opening and closing the inductor circuit for selectively discharging energy to the load and storing energy in the inductors; and a discharge regulating circuit adapted to control a predetermined predictable output voltage profile to allow for remedial action to be taken in response to the predetermined predictable output voltage profile, the discharge regulating circuit monitoring a present voltage from the power source and controlling the selective opening and closing of the inductor circuit by the switching means in response to the present voltage to provide the predetermined predictable output voltage profile such that the predetermined predictable output voltage profile predictably varies in accordance with a decrease in the present voltage.

14. A regulator circuit for regulating an output from an ultracapacitor power source powering a load, comprising:
two or more interleaved inductor circuits, each inductor circuit having at least one inductor;
switching means for selectively opening and closing each of the inductor circuits for selectively discharging energy to the load and storing energy in the inductors; and
a discharge regulating circuit adapted to control a predetermined predictable output voltage profile to allow for remedial action to be taken in response to the predetermined predictable output voltage profile, the discharge regulating circuit monitoring a present voltage from the power source and controlling the selective opening and closing of the inductor circuit by the switching means in response to the present voltage to provide the predetermined predictable output voltage profile such that the predetermined predictable output voltage profile includes a function that predictably varies in accordance with a decrease in the present voltage.

15. A method of storing energy in one or more ultracapacitor and discharging the energy to a load, comprising steps of:
monitoring a present voltage of the one or more ultracapacitor; and
providing a predetermined predictable voltage profile across the load to allow for remedial action to be taken in response to the predetermined predictable output voltage profile, wherein the predetermined predictable voltage profile predictably varies in accordance with a decrease in the present voltage.

16. The method of claim 15, comprising a step of:
operatively coupling one or more inductor to the one or more ultracapacitor; and selectively discharging energy to the load from inductors.

17. The method of claim 15, wherein the time to reach some voltage can be predicted to occur within an accuracy of 10% or better.

18. The method of claim 15, wherein the time to reach some voltage can be predicted to occur within an accuracy of 1% or better.

19. A system for providing energy to a load, comprising
at least one ultracapacitor, the at least one ultracapacitor comprising a present voltage;
at least one inductor coupled in series with the at least one ultracapacitor; and
a circuit, wherein the circuit, the at least one ultracapacitor, and the at least one inductor are operatively coupled to provide a predetermined predictable voltage profile across the load to allow for remedial action to be taken in response to the predetermined predictable output voltage profile, wherein the predetermined predictable voltage profile varies in accordance with a decrease in the present voltage of the at least one ultracapacitor.

20. The system of claim 19, wherein system further comprises an electric motor load.

21. The system of claim 20, wherein the motor is a hybrid vehicle electric motor.

22. The system of claim 19, wherein at any given time the voltage profile describes a discharge curve of the system with an accuracy of 10% or better.

23. The system of claim 19, wherein at any given time the voltage profile describes a discharge curve of the system with an accuracy of about 1%.

24. The system of claim 20, wherein the inductor is rated to handle a current of at least 50 amps.

25. The system of claim 20, wherein source is capable of providing up to 144,000 joules of energy to the load for more than 30 seconds.

26. The system of claim 20, wherein the circuit, the at least one ultracapacitor, and the at least one inductor together comprise a back up source of energy.

27. The system of claim 20, wherein the at least one ultracapacitor and at least one inductor are connected directly.

28. The system of claim 1, wherein the voltage profile varies in accordance with the output voltage of the module after the output voltage reaches a threshold voltage.

29. The method of claim 15, wherein the voltage profile varies in accordance with the present voltage of the module after the present voltage reaches a threshold voltage.

30. The system of claim 19, wherein the voltage profile varies in accordance with the present voltage of the module after the present voltage reaches a threshold voltage.

* * * * *